Nov. 3, 1953
E. R. BOOSER ET AL
2,657,943
MEANS FOR PREVENTING OIL CREEPAGE
Filed April 4, 1950
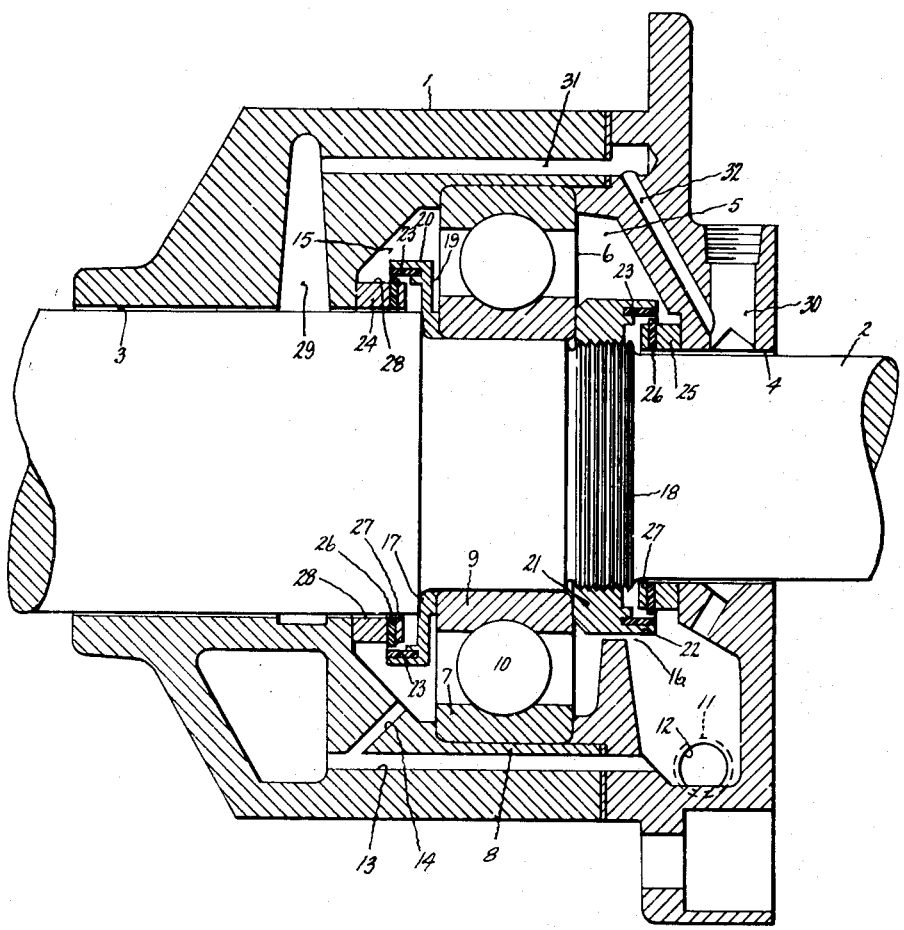
Inventors:
Earl R. Booser,
Donald F. Wilcock,
by *Ernest C Britton*
Their Attorney.

Patented Nov. 3, 1953

2,657,943

UNITED STATES PATENT OFFICE 2,657,943

MEANS FOR PREVENTING OIL CREEPAGE

Earl R. Booser, Lynn, and Donald F. Wilcock, Marblehead, Mass., assignors to General Electric Company, a corporation of New York Application April 4, 1950, Serial No. 153,876

1 Claim. (Cl. 286—5)

This invention relates to oil lubricated devices and in particular to such devices having a rotatable shaft passing through an aperture in a stationary wall and more particularly to such devices wherein there is a tendency for oil to creep past the wall as in oil lubricated bearing assemblies.

Oil lubricated shaft bearing assemblies are frequently provided with oil throwers for centrifugally throwing oil which passes along the shaft from the bearing back into a cavity or reservoir so as to prevent the oil from flowing along the shaft out of the bearing assembly. It has been found, however, that there is a tendency for the oil to creep around the throwing device both during rotation of the shaft and while the shaft is stationary. There is a further tendency for the oil to creep along the wall of the bearing cavity and through the shaft aperture. This tendency for oil to creep through an aperture in a wall through which a rotatable shaft extends is also present in any oil lubricated device such as a gear reduction mechanism.

An object of this invention is to provide means for preventing the creepage of oil around a barrier associated with a stationary wall having an aperture through which a rotatable shaft extends.

Another object of this invention is to provide an improved bearing assembly wherein creepage of oil along the shaft is prevented.

A further object of this invention is to provide an improved bearing assembly having an oil thrower and means for preventing creepage of oil around the thrower.

A still further object of this invention is to provide an improved bearing assembly wherein means are provided for preventing the creepage of oil from the bearing cavity along the shaft.

Yet another object of this invention is to provide an improved oil lubricated device wherein means are provided for preventing the creepage of oil out of the inclosing housing.

Further objects and advantages of this invention will become apparent and the invention will be better understood from the following description referring to the accompanying drawing, and the features of novelty which characterize this invention will be pointed out with particularity in the claim annexed to and forming a part of this specification.

It has been that there is substantially no tendency for the common petroleum and synthetic lubricating oils to creep or spread on a surface formed of the thermoplastic material known as polytetrafluoroethylene. In accordance with one aspect of this invention, therefore, there is provided a bearing assembly comprising a housing with a cavity formed therein and a bearing positioned in the cavity. The shaft is rotatably seated in the bearing and an oil thrower is secured to the shaft within the cavity for centrifugally throwing oil into the cavity which passes along the shaft from the bearing. In order to prevent the creepage of oil around the thrower, the surface of the thrower remote from the throwing surface is formed of polytetrafluoroethylene. As further insurance against the passage of oil out of the bearing, a stationary annular oil barrier is provided surrounding the shaft within the cavity and secured to the wall of the bearing housing through which the shaft extends. This barrier is also formed of polytetrafluoroethylene and prevents the creepage of oil from the cavity through the shaft aperture.

In the drawing there is shown a side elevational view, partly in section, of the improved bearing assembly of this invention.

Referring now to the drawing, there is shown a bearing housing member 1 having its walls apertured to receive shaft 2 as at 3 and 4. A cavity 5 is formed in the housing member 1 and a bearing 6 is positioned in the cavity 5. The bearing shown here is of the antifriction type comprising an outer race 7 arranged in a suitable groove 8 in the wall of the cavity 5, an inner race 9, and a plurality of antifriction bearing elements 10 arranged therebetween. The inner race 9 of the bearing 6 is mounted on the shaft 2. An oil reservoir 11 is also formed in the bearing housing member 1 and is provided with a filling opening 12. The oil is conveyed to the bearing from the reservoir 11 by passages 13 and 14.

It will be readily seen that the oil which is picked up by the antifriction bearing elements 10 will be spread over the surface of the inner race 9 and will tend to flow along the shaft 2 through the apertures 3 and 4 out of the bearing assembly. To prevent this flow, two oil throwers 15 and 16 are provided secured to the shaft 2 on either side of the bearing 6. The oil thrower 15 is seated against a shoulder 17 on the shaft 2 while the thrower 16 threadingly engages threads 18 on the shaft 2 and thus also serves to retain the inner race 9 of the bearing 6 in a position abutting the thrower 15. The thrower 15 is provided with an annular throwing portion 19 and an axially extending flange portion 20 adjacent the outer edge of the annular portion 19. The oil thrower 16 is formed with a body portion 21 and an axially extending flange portion 22. The oil throwers 15 and 16 serve to centrifugally throw into the cavity 5 oil which tends to flow from the bearing 6 along the shaft 2 out of the bearing assembly.

The ordinary petroleum and synthetic lubricating oils have a tendency in various degrees to spread or creep over most materials such as the metal commonly used for lubricant throwers. Thus, in spite of the centrifugal action of the throwers 15 and 16 a certain amount of oil would ordinarily creep around the throwers and along the shaft 2 out of the bearing assembly. This creepage would occur not only when the shaft was rotating but also when the shaft was stationary. In order to prevent this creepage, annular bands of polytetrafluoroethylene thermoplastic material are respectively secured to the inner circumferential surfaces of the flange portions 20 and 22 of the lubricant throwers 15 and 16. These polytetrafluoroethylene surfaces remote from the throwing surfaces of the throwers 15 and 16 effectively prevent creepage of the oil around the thrower both when the shaft is rotating and when the shaft is stationary. While the oil throwers 15 and 16 are shown as being formed of metal with the annular bands 23 of polytetrafluoroethylene forming the surface remote from the throwing surface, it will be readily understood that the entire oil thrower may be formed of polytetrafluoroethylene, or that all exterior surfaces of the thrower may be coated with the polytetrafluoroethylene plastic.

While substantially all of the oil which is thrown into the cavity 5 by the centrifugal action of the oil throwers 15 and 16 will be returned by gravity to the reservoir 11, it will be readily apparent that a certain amount will cling to the inner walls of the cavity 5 and will ordinarily tend to creep from the walls of the cavity along the circumferential surfaces of the apertures 3 and 4 and out of the bearing assembly. In order to prevent this creepage, annular re-entrant flange portions 24 and 25 are provided secured to the inner walls of the cavity 5 adjacent the apertures 3 and 4. These re-entrant flange portions surround the shaft 2 and extend into the cavity 5 toward the bearing 6. At the end of the re-entrant portions 24 and 25 there are respectively provided stationary annular barrier members 26 held in place by suitable retainers 27. The barriers 26 extend into the cavity 5 beyond the outer periphery of the re-entrant flange portions 24 defining gutters 28. In order to prevent the creepage of oil from the inner walls of the cavity 5 around the barriers 26 and out of the bearing assembly, these stationary barriers 26 are also formed of polytetrafluoroethylene thermoplastic material. Thus the oil which clings to the inner surfaces of the cavity 5 is prevented from creeping out of the bearing assembly by the polytetrafluoroethylene barriers 26. The annular flanges 20 and 22 of the lubricant throwers 15 and 16 are shown as overhanging the barriers 26 with a free running clearance there-between in order to prevent oil from being splashed onto the shaft 2. While the barrier 26 is shown as being a relatively thin annular member, it will be readily understood that the entire barrier and re-entrant flange assembly may be formed of polytetrafluoroethylene. Alternatively, the barrier may be coated with a thin layer of polytetrafluoroethylene. Moreover, it will be apparent that barrier 23 is effective alone to prevent the creepage of oil along shaft 2 and barrier 26 is effective alone to prevent the creepage of oil along a wall or surface.

In order to equalize the pressure on either side of the bearing 5, and thus prevent oil from being drawn out of the housing by virtue of a pressure differential, pressure equalizing chambers 29 and 30 are formed in the bearing housing 1 interconnected by passages 31 and 32. While the bearing 5 is shown as being of antifriction type, it will be readily understood that this invention is equally applicable in an assembly in which a sleeve type bearing is utilized. It will be equally apparent that this invention is also applicable to any oil lubricated device inclosed in a housing, for example a gear reduction mechanism.

It will now be readily seen that this invention provides an improved oil lubricated device such as a bearing assembly wherein the passage of lubricant out of the inclosing housing is effectively prevented.

While we have illustrated and described a particular embodiment of this invention, modifications thereof will occur to those skilled in the art. We desire it to be understood, therefore, that this invention is not to be limited to the particular arrangement disclosed, and we intend in the appended claim to cover all modifications which do not depart from the spirit and scope of our invention.

What we claim as new and desire to secure by Letters Patent of the United States is:

In an oil lubricated bearing assembly comprising a bearing housing apertured to receive a shaft and having a cavity formed therein, a bearing positioned in said cavity, a shaft rotatably seated in said bearing, and means for furnishing oil to said bearing; an oil thrower secured to said shaft in said cavity for centrifugally throwing the oil into said cavity which tends to flow along said shaft from said bearing, said oil thrower having an annular throwing portion and an axially extending flange portion adjacent the outer edge of said throwing portion, the inner circumferential surface of said flange portion of said oil thrower being formed of polytetrafluoroethylene whereby creepage of oil around said thrower is prevented, and an annular stationary oil barrier surrounding said shaft, said barrier being positioned in said cavity and secured to said housing defining a gutter with the inner wall of said cavity, the flange portion of said oil thrower overhanging the outer circumferential edge of said barrier, said barrier being formed of polytetrafluoroethylene whereby creepage of oil out of said cavity is prevented.

EARL R. BOOSER.
DONALD F. WILCOCK.

References Cited in the file of this patent

UNITED STATES PATENTS

| Number | Name | Date |
| --- | --- | --- |
| 1,701,707 | Eveno | Feb. 12, 1929 |
| 1,890,839 | Young | Dec. 13, 1932 |
| 1,934,278 | Raule | Nov. 7, 1933 |
| 1,958,378 | Wulfert | May 8, 1934 |
| 2,003,000 | Kelpe | May 28, 1935 |
| 2,393,967 | Brubaker | Feb. 5, 1946 |
| 2,467,312 | Jack | Apr. 12, 1949 |
| 2,500,454 | Evans | Mar. 14, 1950 |
| 2,615,763 | Wolford | Oct. 28, 1952 |